UNITED STATES PATENT OFFICE 2,673,206

25-ETHINYL STEROIDS

August I. Ryer, Montclair, and William H. Gebert, Madison, N. J., assignors to Schering Corporation, Bloomfield, N. J., a corporation of New Jersey No Drawing. Application June 7, 1950, Serial No. 166,772

5 Claims. (Cl. 260—397.2)

The present invention relates to steroid compounds of the nuclearly saturated and unsaturated series, and more particularly to derivatives of cholestane and cholestene and of the various nor-degradation products thereof.

It is the general object of the invention to provide compounds of the types above indicated which themselves possess important therapeutic functions, for example, as anabolic stimulants and in the treatment of arthritis and rheumatoid conditions, or can be utilized as intermediates for the preparation of therapeutic substances.

More specifically, it is an object of the invention to provide 3-substituted cholestane, cholestene, nor-cholestane and nor-cholestene compounds having various groups attached to the 24- or 25-carbon which modify the therapeutic and/or chemical activity of the parent substances.

Other objects and advantages of the invention will appear in the more detailed description hereinafter.

The compounds of the present invention may be represented by the following general formula:

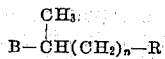

wherein $n$ has the value 2 or 3 and in which B is a member of the group comprising

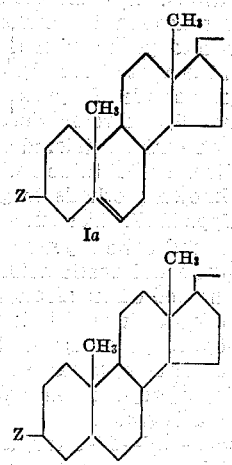

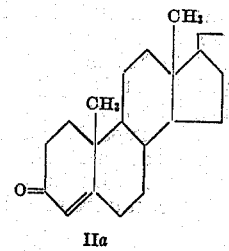

and

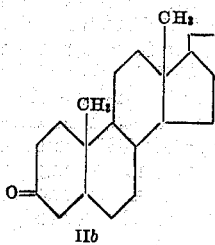

and in which R is a saturated or unsaturated radical of the formula

III wherein X is methyl (when $n$ is 3) or ethyl (when $n$ is 2), Y is a hydrogen atom or an alkyl, alkenyl, alkinyl, alicyclic, aryl, or aralkyl group, and Z and Z' each is a hydroxyl group or a group convertible thereto with the aid of hydrolysis, such as an ester (acetoxy, propionoxy, benzoyloxy, etc.) or ether (methoxy, ethoxy, propoxy, benzoxy, etc.) group, Y and Z' being capable also of forming together an alkenylene radical.

The following equations illustrate certain of the compounds of the present invention and the preferred methods of preparation:

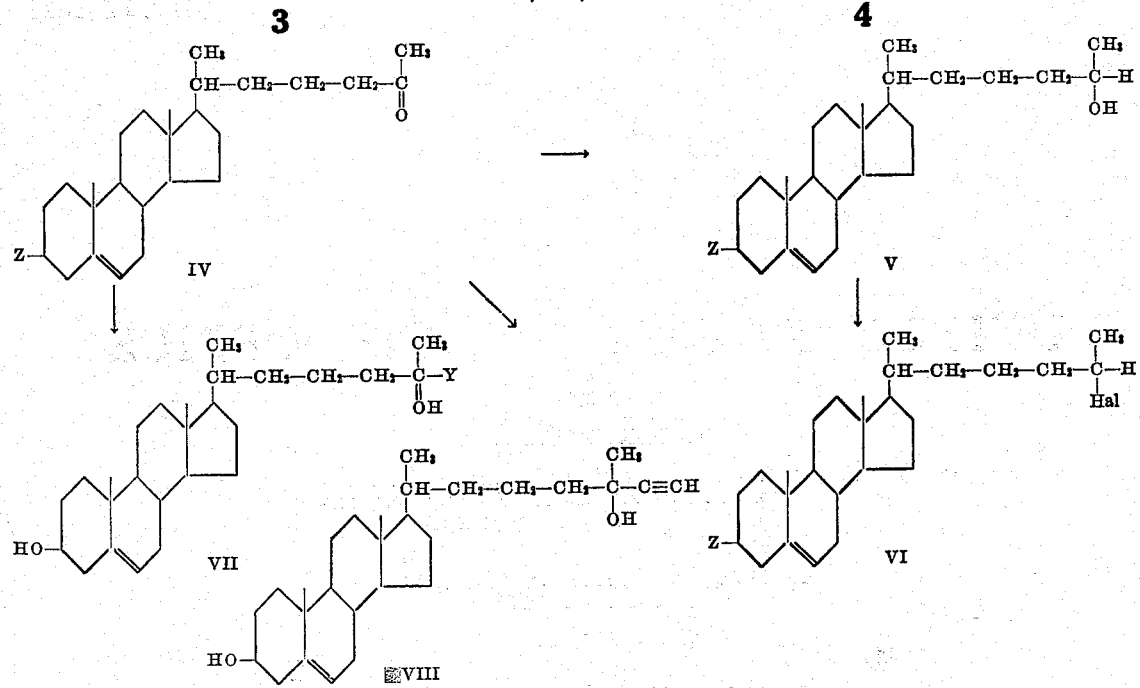

Y and Z having the meaning indicated above, and Hal standing for halogen.

The reduction of 25-ketonorcholesterol derivatives of the Type IV can be accomplished with hydrogen and a catalyst, such as Raney nickel, to give compounds of Type V. Chemical reducing agents such as sodium-alcohol and lithium aluminum hydride may also be advantageously used, and also other catalytic methods of reduction.

The halogenation of 25-hydroxynorcholesterol derivatives of Type V give compounds of Type VI. For example, treatment of Compound V with phosphorus oxychloride or thionyl chloride gives the 25-chloro-derivative of Formula VI.

The reaction of 25-ketonorcholesterol derivatives of Type IV with Grignard reagents give compounds of Type VII. The choice of Grignard reagent determines the nature of the substituent Y. For example, with ethyl magnesium bromide, compounds of Formula VII are obtained wherein Y is ethyl; with cyclohexyl magnesium bromide, Y is cyclohexyl; with benzyl magnesium chloride, Y is benzyl, with phenyl magnesium bromide, it is phenyl, etc.

The condensation of 25-ketonorcholesterol derivatives of Type IV with potassium acetylide or acetylene Grignard reagents give compounds of Type VIII.

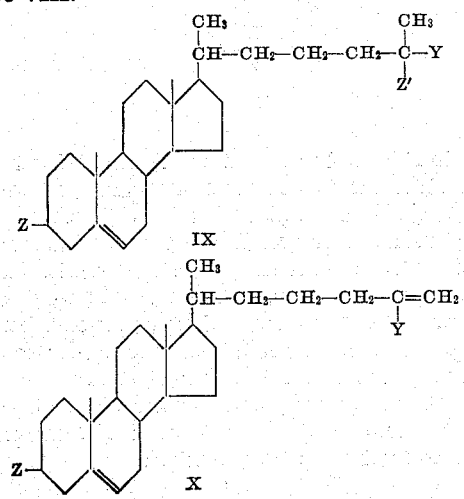

Dehydration of compounds of Type IX wherein Z' is hydroxyl, or dehydrohalogenation of compounds of Type IX wherein Z' is halogen, gives rise to diolefins of Type X. The position of the side-chain double bond is not definitely known but may be located as shown in XI, XII or XIII when Y is ethyl. During these transformations it is preferable to have the 3-hydroxy position protected, for example by acylation to 3-acetoxy, 3-propionoxy, 3-carboethoxy, etc.

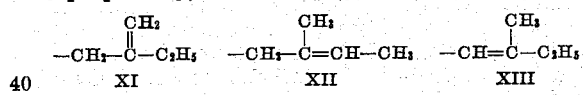

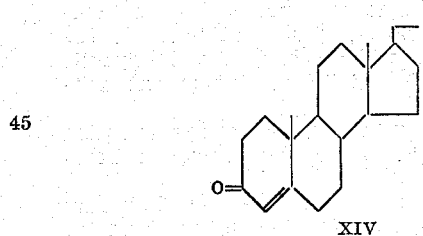

The oxidation of compounds of Types VI, VII, VIII, and X wherein Z is hydroxyl gives $\Delta^{4,5}$-3-keto derivatives of Type XIV. The oxidation is carried out by any of the known methods for such transformations. For example, Oppenauer oxidation with ketones readily converts the 3-hydroxyl to the 3-keto group with a shift of the olefin bond from the $\Delta^{5,6}$ to the $\Delta^{4,5}$ position. Also, by converting compounds of Types VI, VII, VIII, and X into their 5,6-dibromo derivatives, and oxidizing with chromium trioxide, 3-keto-5,6-dibromo derivatives are obtained which are debrominated by known methods to give the keto compounds of Type XIV. For example, the ring double bond can readily be regenerated by treatment with zinc dust and acetic acid, or by treatment with sodium iodide in alcohol or acetone.

With compounds of Type V it is necessary to protect the 25-hydroxyl group, as by acylation before oxidation with a lower fatty acylating agent, like acetic or propionic anhydride, to prevent an attack on this group.

To produce a 3—OH—25-ester, a mixed 3,25-diester can first be prepared by esterifying the 3-acetoxy-25-ol compound with an acyl group which hydrolyzes less readily than the acetyl group, such as the benzoyl group, followed by partial hydrolysis.

For those compounds of general formula

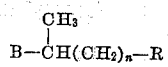

wherein $n$ equals 2, the preferred starting materials are 24-keto-nor-cholesterol derivatives of the Type XV.

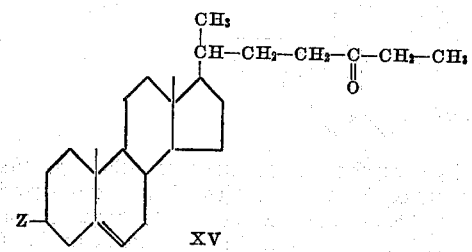

By a similar sequence of reactions as shown for the 25-keto compounds, the 24-keto compounds can be transformed into the corresponding ethinyl, ethylenic, hydroxy, halogen, and the alkyl, alicyclic, aryl, and aralkyl derivatives. As illustrative examples, the following formulae are representative, only the group attached to the 17-carbon being shown:

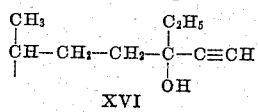 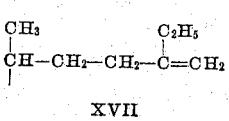

XVI  XVII

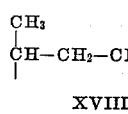 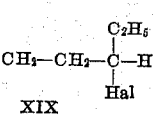

XVIII  XIX

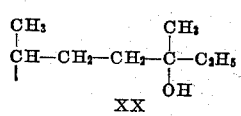

XX

By starting with the corresponding nuclearly saturated sterols, such as 25-ketonorcholestanol and 24-ketonorcholestanol, the corresponding saturated derivatives can be prepared. Those saturated compounds wherein Z is hydroxyl can readily be oxidized to give the corresponding 3-keto derivatives by known methods, such as by treatment with chromium trioxide in acetic acid.

The invention will be further described in the following examples which are presented by way of illustration and not as indicating the scope thereof.

EXAMPLE 1

*25-hydroxy cholesterol*

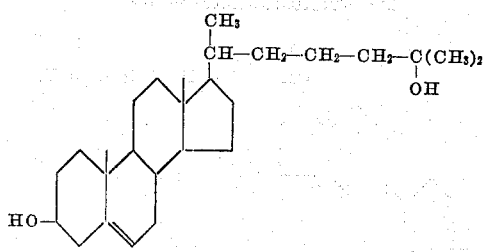

A solution of 85.8 grams of 25-ketonorcholesteryl acetate in 500 ml. of anhydrous thiophene-free benzene was added to a Grignard solution prepared from 24.3 grams of magnesium, 149 grams of freshly distilled methyl iodide, and 575 ml. of anhydrous ethyl ether. The mixture was refluxed for three hours and allowed to stand overnight. After cooling to 5° C., the complex was decomposed by the slow addition of 200 ml. of ice water and 400 ml. of 50% acetic acid solution, and steam distilled until no more oil passed over. The product was filtered at 25° C., washed with water until neutral and dried at 80° C., yielding 82.5 grams of 25-hydroxy cholesterol, M. P. 178.4°–180.5° C. The product was crystallized from methanol and gave fine needles melting at 181.5°–182.5° C.; $[\alpha]_D^{19} = -39.3°$ (2% in $CHCl_3$).

EXAMPLE 2

*25-hydroxycholesteryl acetate*

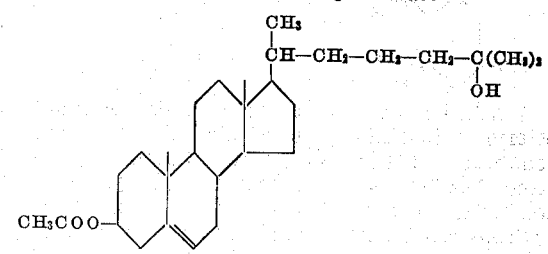

The hydroxycholesterol of Example 1 was acetylated with acetic anhydride and pyridine at 60° C. The crude product was crystallized from acetone to give fine needles melting at 142.4°–142.8° C.; $[\alpha]_D^{20} = -40.4°$ (2% in $CHCl_3$).

EXAMPLE 3

*25-acetoxycholesteryl acetate*

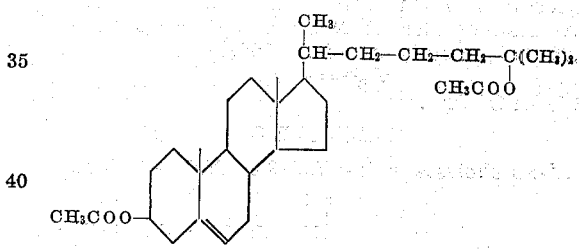

The hydroxycholesterol of Example 1 was acetylated by refluxing with acetic anhydride for several hours. The crude product melted at 115° C.; $[\alpha]_D^{20} = -39.2°$ (2% in $CHCl_3$).

EXAMPLE 4

$\Delta^4$-*cholestene-25-ol-3-one*

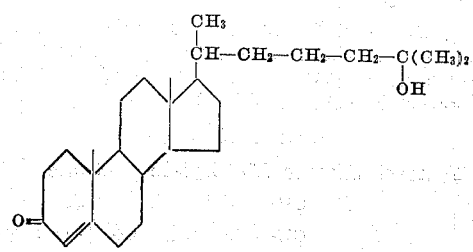

Aluminum isopropoxide (13.0 grams) was added to a hot solution of 25 grams of 25-hydroxycholesterol in 750 ml. of dry toluene and 75 ml. of dry cyclohexanone and the mixture refluxed for two hours. After cooling to 80° C., 200 ml. of water were added and the mixture steam distilled until no more oil passed over. The distillation residue was filtered on a mat of diatomaceous earth and dried. The mixture of product and earth was exhaustively extracted a number of times with methylene chloride to remove the sterol. The combined extracts were concentrated to a low volume and the methylene chloride replaced with ethyl ether. The ethyl ether solution was concentrated until crystals appeared, cooled and filtered. The crude product was recrystallized from acetone to give 16.0 grams of Δ⁴-cholestene-25-ol-3-one melting at 148.0°–148.4° C.; $[\alpha]_D^{20}=+88.4°$ (2% in CHCl₃).

EXAMPLE 5

Δ⁵-norcholestene-25-ethyl-3.25-diol

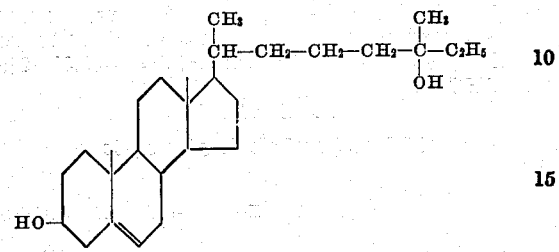

A solution of 100 grams of 25-ketonorcholesteryl acetate in 640 ml. of thiophene-free benzene was added to a Grignard solution prepared from 28.4 grams of magnesium, 364 grams of freshly distilled ethyl iodide and 670 ml. of anhydrous ethyl ether. The mixture was refluxed for four hours and allowed to stand overnight. After cooling to 5° C., the mixture was decomposed by the slow addition of 200 ml. of ice water and 400 ml. of 50% acetic acid solution, and then steam distilled until no more oil passed over. The product was filtered at 25° C., washed with water until neutral and dried at 80° C., yielding 98.9 grams. The crude product was recrystallized successively from acetone and ethyl acetate to give fine needles of Δ⁵-norcholestene-25-ethyl-3,25-diol, melting at 154.2°–158.4° C.;

$$[\alpha]_D^{20}=-35.7°$$

(2% in CHCl₃).

EXAMPLE 6

Δ⁵-norcholestene-25-ethyl-3,25-diol-3-acetate

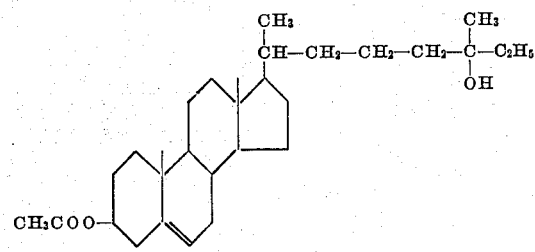

The product of Example 5 was acetylated according to the method described in Example 2. The pure monoacetate melted at 111.2°–111.6° C.; $[\alpha]_D^{23}=-39.5°$ (2% in CHCl₃).

EXAMPLE 7

Δ⁴-norcholestene-25-ethyl-25-ol-3-one

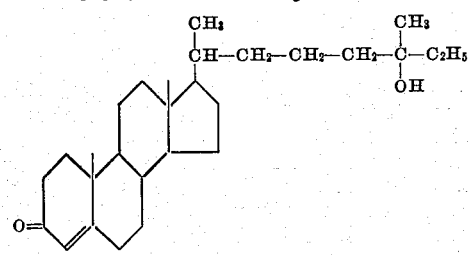

The diol of Example 5 was oxidized by the procedure given in Example 4, corresponding molar proportions being used. The combined methylene chloride extracts were concentrated to a low volume and this solvent replaced with methanol. The methanolic solution was concentrated to a thick crystal slurry, cooled and filtered. The pure product after successive recrystallizations from methanol and acetone melted at 24.5°–127.2° C.; $[\alpha]_D^{21}=+82.0°$ (2% in CHCl₃).

EXAMPLE 8

25-dehydrocholesteryl acetate

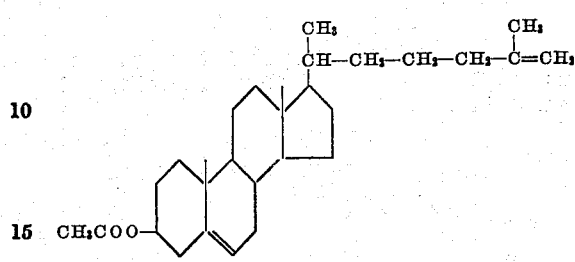

25-hydroxycholesteryl acetate (25.5 grams) was refluxed for ½ hour with 750 ml. of dry pyridine and 25.5 ml. of freshly distilled phosphorous oxychloride. The mixture was cooled to 20° C. and poured into ice water with agitation. The resulting crystals were filtered, washed neutral with water and dried, yielding 24.0 grams. The crude product was dissolved in hot benzene, treated with 20-grams of activated carbon and filtered through a mat of diatomaceous earth. The filtrate was concentrated to a small volume and the benzene completely replaced with methanol by co-distilling with methanol until no more benzene passed over in the distillate. The methanol solution was concentrated to a thin slurry of crystals, cooled to 5° C. and filtered to give 21.0 grams of plates, melting at 93.5°–94.0° C.; $[\alpha]_D^{20}=-43.6°$ (2% in CHCl₃).

EXAMPLE 9

25-dehydrocholesterol

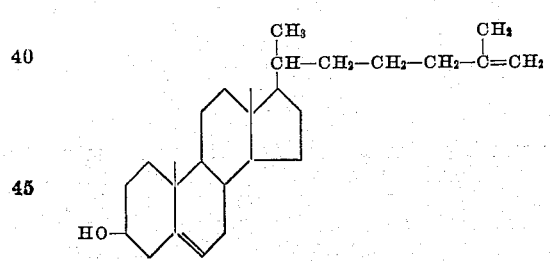

25-dehydrocholesterol acetate was hydrolyzed by refluxing with methanolic potassium hydroxide for about two hours. The product was recrystallized from methanol to give very fine needles, M. P. 121°–122° C.; $[\alpha]_D^{22.5}=-43.0°$ (2% in CHCl₃).

EXAMPLE 10

Δ⁴,²⁵-cholestadiene-3-one

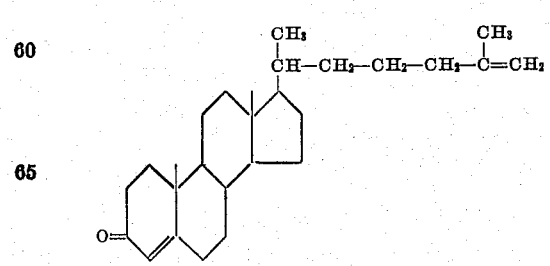

25-dehydrocholesterol was oxidized following the procedure given in Example 7. The pure compound melted at 86.6°–89.0° C ;

$$[\alpha]_D^{24}=+90.1°$$

(2% in CHCl₃).

EXAMPLE 11

Δ$^5$-norcholestene-25-ethinyl-3,25-diol

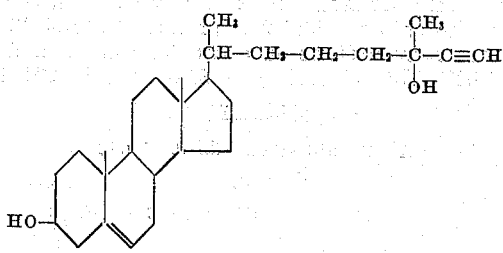

Acetylene was passed into a solution of 28.5 grams of potassium in 1.5 liters of liquid ammonia until the blue color disappeared. A solution containing 100 grams of 25-ketonorcholesteryl acetate dissolved in 500 ml. of dry pyridine was then added dropwise. The reaction mixture was allowed to stand at room temperature until the ammonia had evaporated. Water (1 liter) was added and the mixture heated at 85° C. for a short time, then cooled to room temperature and filtered. The crude product, which when dry weighed 94.0 grams, was recrystallized several times from methanol and benzene giving the pure compound melting at 175.6°–177.4° C.; $[α]_D^{22.5}$=—37.2° (2% in CHCl₃).

EXAMPLE 12

Δ$^4$-norcholestene-25-ethinyl-25-ol-3-one

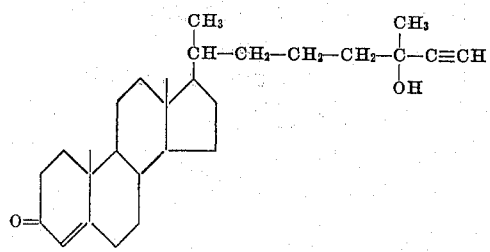

Δ$^5$-norcholestene-25-ethinyl-3,25-diol, obtained according to Example 11, was oxidized following the procedure given in Example 4. The combined methylene chloride extracts were concentrated to a low volume and the solvent completely replaced with ethyl ether. The ether solution was concentrated to a thick crystal slurry, cooled and filtered. The crude product was recrystallized successively from ethyl acetate and methanol to give the pure compound, M. P. 172.6°–173.2° C.; $[α]_D^{23}$=+87.2° (2% in CHCl₃).

EXAMPLE 13

Δ$^5$-norcholestene-3,25-diol-3-acetate

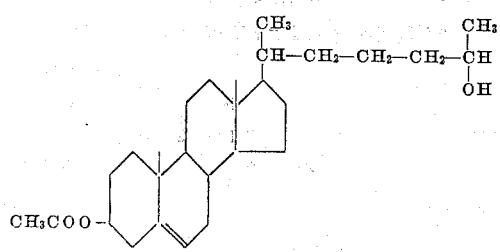

To 40 grams of 25-ketonorcholesteryl acetate dissolved in 300 ml. of benzene was added Raney nickel catalyst (prepared from 90 grams of Raney nickel catalyst powder) suspended in 100 ml. of methyl alcohol. The suspension was reduced with hydrogen for ten hours at 20 lbs. pressure. The reaction mixture was filtered through diatomaceous earth which was then washed with methanol. The filtrate was concentrated to dryness and the residue recrystallized from methanol to give a polymorphic mixture, M. P. 117°–129° C.; $[α]_D^{19}$=—40.8° (2% in CHCl₃).

EXAMPLE 14

Δ$^5$-norcholestene-3,25-diol

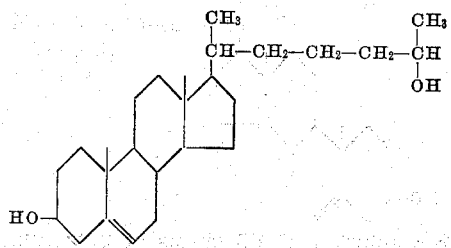

A solution of 23.2 grams of potassium carbonate in 70 ml. of water was added to a solution of 39 grams of Δ$^5$-norcholestene-3,25-diol-3-acetate in 470 ml. of methanol and the mixture refluxed for two hours. The mixture was poured into water and the precipitated product filtered and dried. After successive recrystallizations from acetone and benzene, the polymorphic product melted at 158°–168° C.; $[α]_D^{20}$=—36.9° (2% in CHCl₃).

EXAMPLE 15

Δ$^5$-norcholestene-3,25-diol diacetate

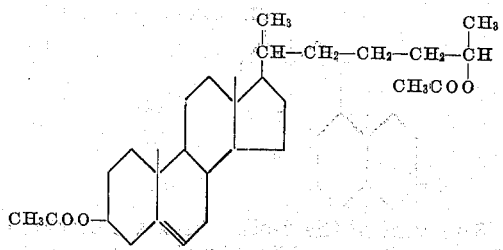

The diol of Example 14 was acetylated by refluxing with acetic anhydride. The pure compound (recrystallized from methanol) melted at 85.6°–86.6° C.; $[α]_D^{23}$=—37.8° (2% in CHCl₃).

EXAMPLE 16

Δ$^5$-norcholestene-3,25-diol-3-acetate-25 benzoate

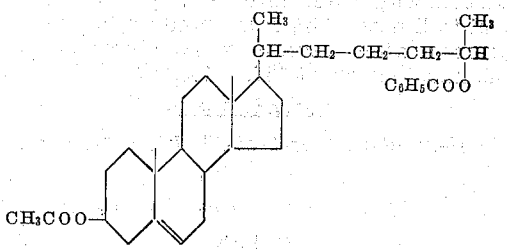

To a solution of 50 grams of Δ$^5$-norcholestene-3,25-diol-3-acetate in 300 ml. of dry dioxane and 92 ml. of dry pyridine at 11° C. was slowly added 40 ml. of benzoyl chloride. The mixture was stirred for two hours and allowed to stand at room temperature overnight. Concentrated ammonium hydroxide (47 ml.) was added keeping the temperature below 15° C. The mixture was then poured into ice water and the resulting oil separated and washed with water by decantation. The oil was dissolved in acetone and the acetone concentrated to a low volume. The acetone was replaced with ethyl ether by co-distilling with ether until no more acetone passed over in the distillate. The volume of the ether was then adjusted to 100 ml. Upon standing in a refrigerator overnight a thick mass of crystals separated. An equal volume of petroleum ether was added, the crystals filtered and dried to give 23.5 grams, M. P. 82.4°-89.5° C.

EXAMPLE 17

Δ⁵-norcholestene-3,25-diol-25-benzoate

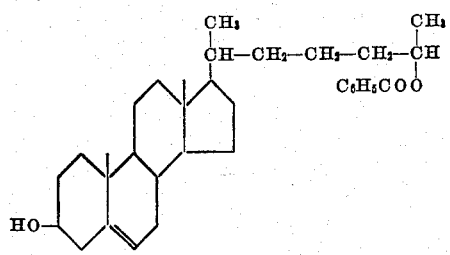

To a solution of 1.5 grams of potassium hydroxide in 900 ml. of methanol was added 15 grams of the 3-acetate-25-benzoate prepared in Example 16. The mixture was stirred for 33 hours at 15°-20° C., poured into water and filtered. The crude product weighing 12.5 grams was recrystallized from methanol and dried in a vacuum oven to give the pure compound, M. P. 79.5°-81.2° C.; $[\alpha]_D^{22}=-29.7°$ (2% in CHCl₃).

EXAMPLE 18

Δ⁴-norcholestene-25-ol-3-one

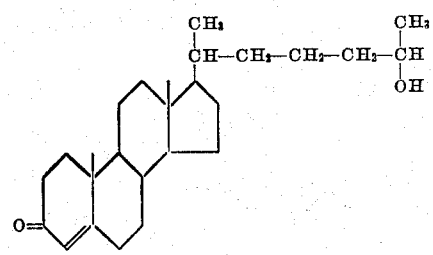

8.0 grams of the 3-ol-25-benzoate prepared in Example 17 was oxidized by the procedure given in Example 4. The methylene chloride extracts were evaporated to dryness and the resulting oil hydrolyzed by refluxing two hours with a solution of 3.7 grams of potassium hydroxide in 96 ml. of methanol. The hydrolysis mixture was poured into water, filtered and the product washed with water until the washings were neutral to litmus. The crude product (weighing 6.3 grams) after several recrystallizations from methanol melted at 157.6°-158.1° C.

EXAMPLE 19

Δ⁵-norcholestene-3-ol-25-chloro-3-acetate

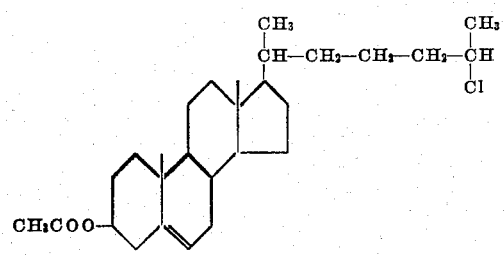

To a solution of 40 grams of Δ⁵-norcholestene-3,25-diol-3-acetate in 1200 ml. of dry pyridine was added 40 ml. of freshly distilled phosphorus oxychloride. The mixture was refluxed for ½ hour, cooled to 10° C. and the excess phosphorus oxychloride destroyed by the slow addition of ice. After pouring into excess water, the precipitated product was filtered and washed neutral with water. The dried crude product was dissolved in 1 liter of hot benzene and filtered to remove a brown insoluble substance. The filtrate after treatment with decolorizing charcoal was concentrated to a low volume and the benzene replaced with methanol. The methanol solution was concentrated until it became turbid, cooled and filtered to yield 23.0 grams. Recrystallizations from acetone gave needles that melted at 116.2°-117.0° C.; $[\alpha]_D^{23}=-35.4°$ (2% in CHCl₃).

EXAMPLE 20

Δ⁵-norcholestene-25-chloro-3-ol

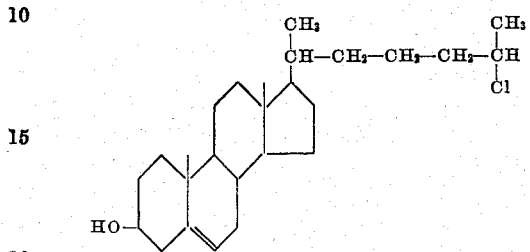

15 grams of the acetate of Example 19 were refluxed for two hours with a solution of 8.5 grams of potassium hydroxide in 420 ml. of ethanol. The hydrolysis mixture was poured into excess water, filtered and washed neutral with water. The crude product (weight 13.5 grams) after recrystallization from methanol and from acetone gave fine needles that melted at 132.0°-133.0° C.; $[\alpha]_D^{29}=-38.6°$ (2% in CHCl₃).

EXAMPLE 21

Δ⁴-norcholestene-25-chloro-3-one

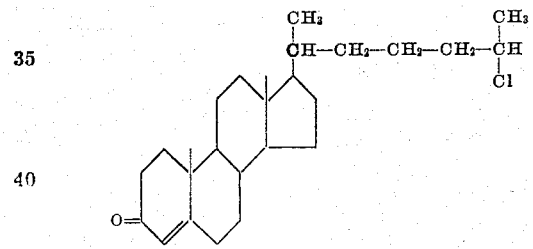

10.5 grams of Δ⁵-norcholestene-25-chloro-3-ol was oxidized following the procedure given in Example 4. The methylene chloride extracts were concentrated to dryness, dissolved in methanol and treated with decolorizing charcoal. The solution was concentrated to 50 ml. and stored overnight in a refrigerator. The precipitated product was separated by filtration and dried to yield 8.0 grams. After successive recrystallizations from methanol and acetone, the needle-like product melted at 119.0°-119.9° C.; $[\alpha]_D^{20}=+101.6°$ (2% in CHCl₃).

EXAMPLE 22

24-hydroxy-24-methyl norcholesterol

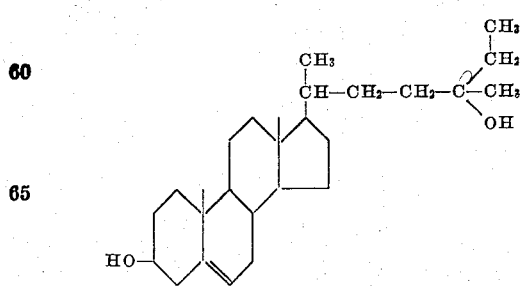

A solution of 1.5 grams of 24-ketonorcholesteryl acetate in 15 ml. of anhydrous thiophene-free benzene was added to a Grignard solution prepared from 0.47 gram of magnesium, 2.88 grams of methyl iodide and 10 ml. of anhydrous ethyl ether. The mixture was refluxed for 2 hours and allowed to stand overnight. After cooling to 5° C., the complex was decomposed by the addition of 3.5 ml. of water and 7 ml. of 50% acetic acid, and steam distilled until no more oil passed over. The product was filtered at room temperature, washed with water until neutral and dried. The crude product weighing 1.38 grams melted at 165–168° C.

EXAMPLE 23

$\Delta^5$-*norcholestene-3,24-diol-3-acetate*

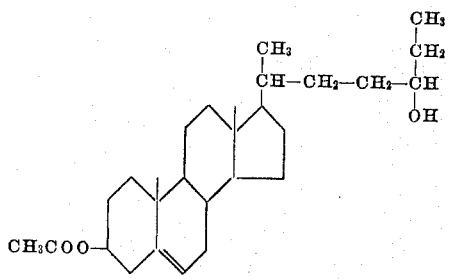

24-ketonorcholesteryl acetate was reduced by the procedure given in Example 13, the same catalyst and pressure being used. The monoacylated diol was obtained.

EXAMPLE 24

$\Delta^5$-*norcholestene-3-ol-24-chloro-3-acetate*

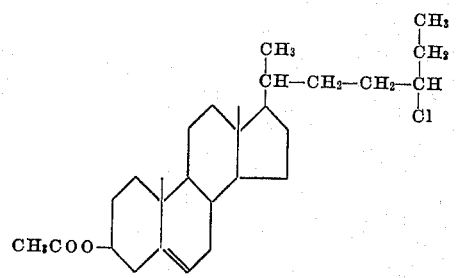

$\Delta^5$-norcholestene-3,24-diol-3-acetate was chlorinated by the procedure given in Example 19, and gave a product of the formula shown above.

EXAMPLE 25

$\Delta^5$-*norcholestene-24-cyclohexyl-3,24-diol*

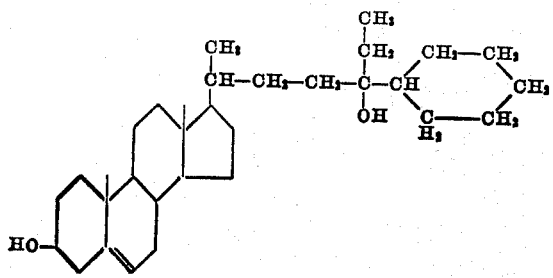

A solution of 1.0 gram of 24-ketonorcholesteryl acetate in 10 ml. of anhydrous benzene was added to a Grignard solution prepared from 0.32 gram of magnesium, 2.22 grams of cyclohexyl bromide and 10 ml. of anhydrous ethyl ether. The mixture was refluxed for 3 hours and allowed to stand overnight. The Grignard complex was decomposed and the product isolated as described in Example 22.

EXAMPLE 26

$\Delta^5$-*norcholestene-24-benzyl-3,24-diol*

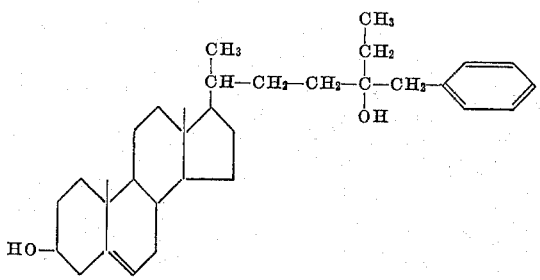

A solution of 2.0 grams of 24-ketonorcholesteryl acetate in 20 ml. of anhydrous benzene was added to a Grignard solution prepared from 0.63 gram of magnesium, 4.6 grams of benzyl bromide and 15 ml. of anhydrous ethyl ether. The mixture was refluxed for 3 hours and allowed to stand overnight. The resulting Grignard complex was decomposed with water and the product isolated as described in Example 22.

We claim:

1. A compound selected from the group consisting of nuclearly saturated and unsaturated 25-OY-25-ethinyl norcholestenes having at the 3-position a member of the class consisting of secondary hydroxyl and keto groups, Y being a member of the class consisting of hydrogen and the acyl groups of lower alkanoic and benzoic acids.
2. $\Delta^5$-norcholestene-25-ethinyl-3,25-diol.
3. $\Delta^4$-norcholestene-25-ethinyl-25-ol-3-one.
4. 25-hydroxyl-25-ethinyl norcholestanes.
5. 25-hydroxyl-25-ethinyl norcholestenes.

AUGUST I. RYER.
WILLIAM H. GEBERT.

References Cited in the file of this patent
Riegel, Journ. Am. Chem. Soc. 66, 723–724 (1944).